UNITED STATES PATENT OFFICE.

OTTO BERGAMI, OF BERLIN-KARLSHORST, AND CARL SAEMANN, OF BERLIN-FRIEDENAU, GERMANY, ASSIGNORS TO ACTIEN GESELLSCHAFT FÜR ANILIN FABRIKATION, OF BERLIN, GERMANY.

PROCESS FOR THE MANUFACTURE OF BETAIN FROM VINASSES.

1,219,226. Specification of Letters Patent. Patented Mar. 13, 1917.

No Drawing. Application filed March 4, 1914. Serial No. 822,371.

*To all whom it may concern:*

Be it known that we, OTTO BERGAMI and CARL SAEMANN, subjects of the King of Prussia, residing at Berlin-Karlshorst, Germany, and Berlin-Friedenau, Germany, (our post-office addresses being Prinz-Oskarstrasse 5, Berlin-Karlshorst, Germany, and Lauterstrasse 5-6, Berlin-Friedenau, Germany,) have invented certain new and useful Improvements in Processes for the Manufacture of Betain from Vinasses, of which the following is a specification.

Methods hitherto known for the industrial production of betain or its salts from vinasses or the like are essentially of two kinds. One consists in extracting the parent material directly with alcohol and working up to pure betain or its salts the crude product dissolved by alcohol. In the other method the sugar still present in the parent material is changed by action of gaseous hydrogen chlorid into humous substances, the betain being converted into its hydrochlorid; the humous substances are separated by filtration, the alkali chlorids and the hydrochlorid of glutamic acid which are present in the solution are allowed to crystallize, and the betain hydrochlorid is extracted by alcohol from the solution which has been evaporated to the consistence of a syrup.

Now by the process of our present invention the formation of humous substances is completely avoided and the betain is separated in the form of a salt and preferably in the form of the hydrochlorid; and the yields are much better than in the known processes. This new process consists in removing as far as possible by evaporation in a vacuum the water from the vinasses or the like which serves as parent material. This evaporation may be performed with the addition of hydrochloric acid or another inorganic acid or without such addition. In the latter case the residue, after evaporation, is mixed with concentrated hydrochloric acid under such conditions that a temperature conducing to the formation of humous substances is not attained. By cooling the mass all of the betain except a small residue, separates in the form of the hydrochlorid or another hydrogen halid mixed with alkalichlorid. From this impure betaïn-hydrochlorid, etc., chemically pure betain-hydrochlorid, etc., is obtained in known manner, for instance by crystallization from methyl-alcohol and recrystallization from water.

If hydrochloric acid or another suitable inorganic acid, such as hydrobromic acid or hydriodic acid, is added to the parent material before evaporation, this evaporation in a vacuum is also effected at a moderate temperature, for example at 50–60° C. until copious crystallization begins from the warm solution. Whereas during the evaporation of the parent material acidified with hydrochloric acid under ordinary pressure humous substances are formed, as is known, and such substances impart a dark color to the betain hydrochlorid which crystallizes, there is obtained by the process of our present invention a concentrated solution free from humous substances, from which, on cooling, crude betain hydrochlorid mixed chiefly with inorganic salts crystallizes. In order to produce rapid separation, the evaporated solution may be mixed with a further quantity of hydrochloric acid, for instance 10% of acid of 37–38% strength calculated on the original weight of the parent material and then the mass is cooled.

In carrying out our new process of course hydrochloric acid is preferably used as the inorganic acid; from the hydrochlorid of betain either betain itself or other salts thereof may be produced in known manner. It may be stated, however, that our process can also be carried out for instance with the aid of hydrobromic acid.

The following examples may serve to illustrate our invention:

1. A vinasse which has been nearly dehydrated by evaporation in a vacuum, is mixed with sufficient concentrated hydrochloric acid of 1.19 specific gravity to produce a strongly acid reaction to Congo indicator. The operation of mixing the still warm, dehydrated vinasse with the hydrochloric acid should be conducted in such a manner, advantageously with aid of cooling, that the temperature does not exceed 50–60° C. When the mixture is cooled crude betain hydrochlorid crystallizes; it is filtered, washed with a little alcohol and dried.

The crude product thus obtained may be purified in known manner, for instance by crystallization from methyl alcohol, whereby a product of a purity of 95 per cent. is obtained, which may be converted into snow-white betain hydrochlorid by crystallization from water in the presence of animal charcoal.

2. 300 kilos of vinasse of a specific gravity 1.42 (43° Bé.) are gradually added while stirring with 165 kilos of hydrochloric acid of 32% strength, care being taken by cooling, that the temperature does not surpass about 55° C. Then the mass is heated in a vacuum at about 50–60° C. and the water is distilled off in a quantity of about 85 kilos, whereupon the residue is more strongly acidified by the addition of 30 kilos of hydrochloric acid of 37–38% strength. The mass having been cooled down to about 15° C. it is drained, in order to separate the precipitate consisting of a mixture of betain hydrochlorid with inorganic salts. This mixture is washed with ethyl alcohol in order to remove the mother lye and then dried; the product thus obtained after cooling is treated at the boiling point with about 500 kilos of methyl alcohol and the hot solution is filtered off from the undissolved inorganic salts; from the filtrate on cooling the betain hydrochlorid crystallizes, whereas the rest may be obtained by evaporating the mother liquor. The betain hydrochlorid thus obtained possesses a great degree of purity; it may be obtained in a chemically pure state by one recrystallization from water in the presence of animal charcoal.

In order to obtain the betain itself from the respective inorganic salt thereof, an alcoholic solution of the salt may be acted upon with a solution of an alkali in strong alcohol.

It is obvious that our present invention is not limited to the foregoing examples or to the details given therein. It may be stated that the proportions of the hydrogen halid to be added to the molasses or the vinasses either in one or two portions are to be varied according to the special quality or origin thereof.

Having now described our invention and the manner in which it may be carried out what we claim is:—

1. The process for the manufacture of betain from vinasses, consisting in freeing the parent material from water in a vacuum, the separation of the betain from the parent material being effected by the addition of an inorganic acid.

2. The process for the manufacture of betain from vinasses, consisting in freeing the parent material from water in a vacuum, the separation of the betain from the parent material being effected by the addition of a hydrogen halid.

3. The process for the manufact betain from vinasses, consisting in the parent material from water in a and effecting separation of the betain the addition of a hydrogen halid.

4. The process for the manufactu betain salt from vinasses, consist freeing the parent material from wa vacuum and effecting separation betain salt by the addition of hydro acid.

5. The process for the manufactu betain salt from vinasses, consisting ing an inorganic acid to the parent n while maintaining the mass at a temp of about 55° C., freeing the mass fror by evaporation in a vacuum and th ing further quantities of an inorgan 6. The process for the manufactu betain salt from vinasses, consisting ing a hydrogen halid to the paren rial while maintaining the mass at perature of about 55° C., freeing tl from water by evaporation in a and then adding further quantitie hydrogen halid, the hydrogen h betain being thus separated.

7. The process for the manufactu betain salt from vinasses, consisting ing to the parent material such a qua hydrochloric acid as will effect sligh reaction while maintaining the ma temperature of about 55° C., free mass from water by evaporation in a v adding further quantities of hydr acid, until strongly acid reaction to indicator occurs and allowing the hydrochlorid to crystallize out.

8. The process for the manufactu betain salt from vinasses, consisting ing to the parent material such a c of hydrochloric acid as will effect acid reaction, freeing the mass fror by evaporation in a vacuum, adding quantities of hydrochloric acid strongly acid reaction to Congo ir occurs, allowing the betain hydroch crystallize out, draining it from the liquor, washing the residue with eth hol to remove the remainder of the lye, treating the product thus obtain hot methyl alcohol, filtering off th solved inorganic salts, and cryst betain hydrochlorid from the filtra recrystallizing the betain hydrochlor water with the addition of anima coal.

9. The process for the manufac betain from vinasses consisting in the parent material from water in a effecting separation of the betain in t of the salt of a hydrogen halid by tl tion of a hydrogen halid and separa mixture of the betain hydrogen ha inorganic salts which crystallizes o the mother liquor by draining and washing with ethyl alcohol, extracting the betain hydrogen halid with methyl alcohol, from which alcoholic solution the free betain is
5 obtained by the action of an alkali in a known manner.

In testimony whereof we have hereunto set our hands in presence of two subscribing witnesses.

OTTO BERGAMI.
CARL SAEMANN.

Witnesses:
WOLDEMAR HAUPT,
HENRY HASPER.